United States Patent [19]

Vandenberg et al.

[11] Patent Number: 4,879,971

[45] Date of Patent: Nov. 14, 1989

[54] CONTROLLED LIFT GATE SYSTEM FOR MILKING PARLORS

[76] Inventors: August Vandenberg, 1904 Trotter Trail, Norco, Calif. 91760; Ben W. Vandenberg, 17224 Gard Ave., Artesia, Calif. 90701; Andrew W. Vanderberg, 15751 Ryon St.; Ben E. Haws, 8828 Laurel St., both of Bellflower, Calif. 90706

[21] Appl. No.: 204,395

[22] Filed: Jun. 9, 1988

[51] Int. Cl.⁴ .............................................. A01K 1/12
[52] U.S. Cl. ................................. 119/14.03; 49/119; 49/360
[58] Field of Search ................ 119/14.01, 14.03, 16, 119/27; 49/360, 119

[56] References Cited

U.S. PATENT DOCUMENTS

| | | | |
|---|---|---|---|
| 1,578,028 | 3/1926 | Healy | 49/199 |
| 2,260,080 | 10/1941 | Lane | 49/199 |
| 2,757,604 | 7/1956 | Hill | 49/199 |
| 2,854,282 | 9/1958 | Nichols | 49/199 X |
| 3,714,737 | 2/1973 | Fillion et al. | 49/360 |
| 3,810,442 | 5/1974 | Jacobs et al. | 119/14.03 |
| 3,821,865 | 7/1974 | Steinke | 49/360 X |
| 4,194,467 | 3/1980 | Nielsen et al. | 119/14.03 |
| 4,362,127 | 12/1982 | Nielsen et al. | 119/14.03 |
| 4,419,961 | 12/1983 | Vanderberg et al. | 119/14.03 |
| 4,508,059 | 4/1985 | Anderson | 119/14.03 |
| 4,513,687 | 4/1985 | De Jong | 119/14.03 X |
| 4,715,321 | 12/1987 | Vanderberg et al. | 119/14.03 |

Primary Examiner—Richard J. Apley
Assistant Examiner—Robert W. Bahr
Attorney, Agent, or Firm—Cislo & Thomas

[57] ABSTRACT

Controlled vertically swinging exit gates for milking parlor stalls having resilient control devices for lowering the gates in a smooth and controlled manner and to stop jerking downward or upward movement of the gate upon opening and closing, comprising two horizontally movable pulleys fastened to a draw-bar which actuates opposing cables to smoothly control operation of the gates.

15 Claims, 7 Drawing Sheets

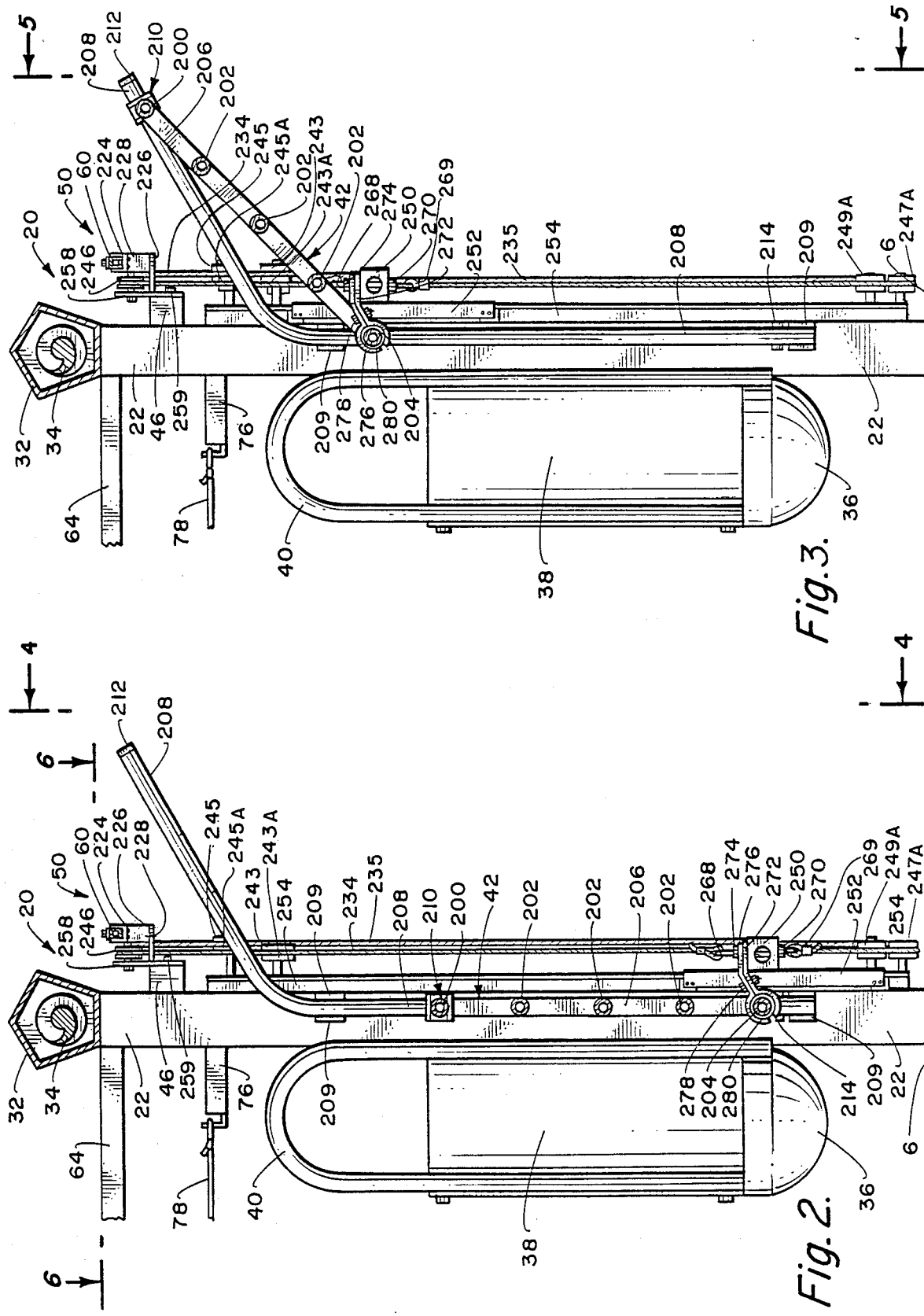

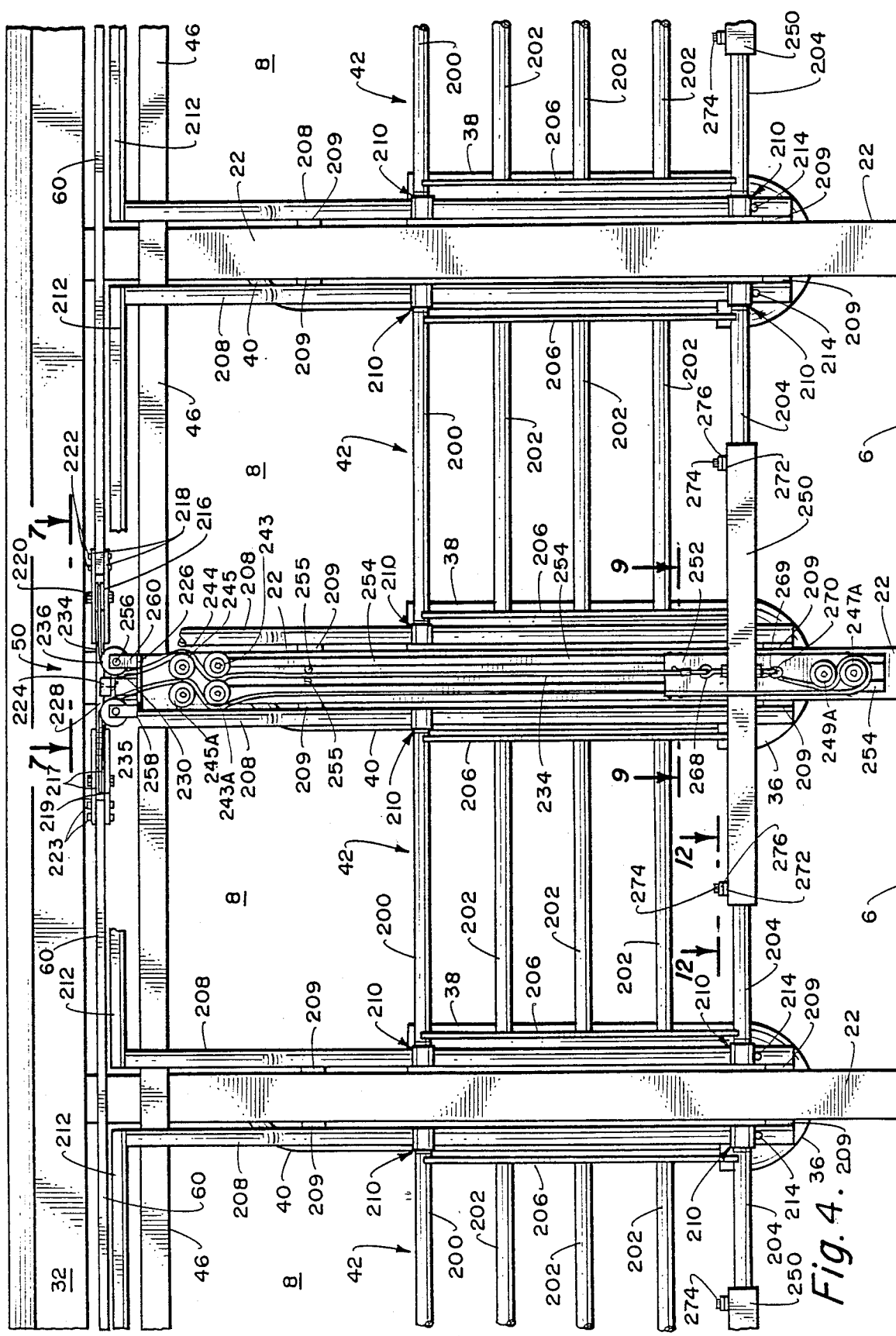

CONTROLLED LIFT GATE SYSTEM FOR MILKING PARLORS

BACKGROUND OF THE INVENTION

This invention relates to milking parlor structures and, more particularly, to improved stall gates for milking parlors.

The prior art is well aware of milking barn constructions or parlors of the modern type wherein a milking pit is sandwiched between juxtapositioned cattle stands, wherein cattle are allowed to enter the milking parlor structure to be milked and to incidentally be fed. The feeding acts as an enticement to attract the individual dairy cattle to the individual stations at which milking of the cow may take place.

Exemplary of prior art structures are U.S. Pat. Nos. 4,419,961 and 4,715,321, issued Dec. 1983 and Dec. 1987, respectively, to August Vandenberg et al, the inventors of the present invention. Each of the prior Vandenberg et al patents discloses a milking parlor construction including a basic module that comprises a hollow vertical upright member from which the feed bowl and accompanying shroud and individual exit gates forming the individual milking stations may be hung. The '961 patent discloses a milking parlor construction wherein the exit gates of the individual stalls open by swinging horizontally to permit the cows to leave the stall. The '321 patent teaches the use of vertical swing exit gates which provide a more compact structure and, hence, enable the milking parlors to be installed in smaller barns.

Unfortunately, after repeated use and through less than careful operation, opening and closing of the milking parlor gates causes associated cables to fall off associated pulley assemblies. Also, the cables wear improperly because of the jerking action associated with the opening and closing of the gates as a counterweight keeps tension on the cables through the opening and closing operation.

To overcome these problems of the prior art, the present invention discloses an improved cattle stall exit gate which provides resilient means to regulate the opening and closing movement of vertically swinging gates, whereby a controlled movement prevents the cable assembly from falling off the pulley assembly and allows the cable to wear more evenly. The advantages of the present invention are preferably attained by preventing the gravity free-fall of vertically swinging exit gates and providing resilient means for lowering the gates in a smooth and controlled manner and to stop a jerking downward movement of the gate.

Accordingly, it is an object of the present invention to provide improved milking parlor stalls for cattle.

Another object of the present invention is to provide improved exit gates for milking parlor stalls.

A further object of the present invention is to provide improved gates for milking parlor stalls which require a minimum of lateral space for operation.

A specific object of the present invention is to provide vertically swinging exit gates for milking parlor stalls having resilient means for lowering the gates in a smooth and controlled manner and to stop a jerking downward movement of the gates.

A specific object of the present invention is to provide vertically swinging gates for milking parlor stalls having a resilient means which controls the lowering and raising of the gates, thereby preventing a jerking motion which keeps associated cables within associated pulley assemblies.

These and other objects and features of the present invention will be apparent from the following detailed description taken with reference to the figures of the accompanying drawings.

BRIEF DESCRIPTION OF THE DRAWINGS

FIG. 2 is a side elevational view, partially in cross-section, taken along the line 2—2 of FIG. 1, showing the gate in the down or closed position;

FIG. 3 is a view similar to that of FIG. 2, but showing the gate in the raised or open position;

FIG. 4 is a front elevational view, taken along the line 4—4 of FIG. 2;

DETAILED DESCRIPTION OF THE INVENTION

Figure 1:
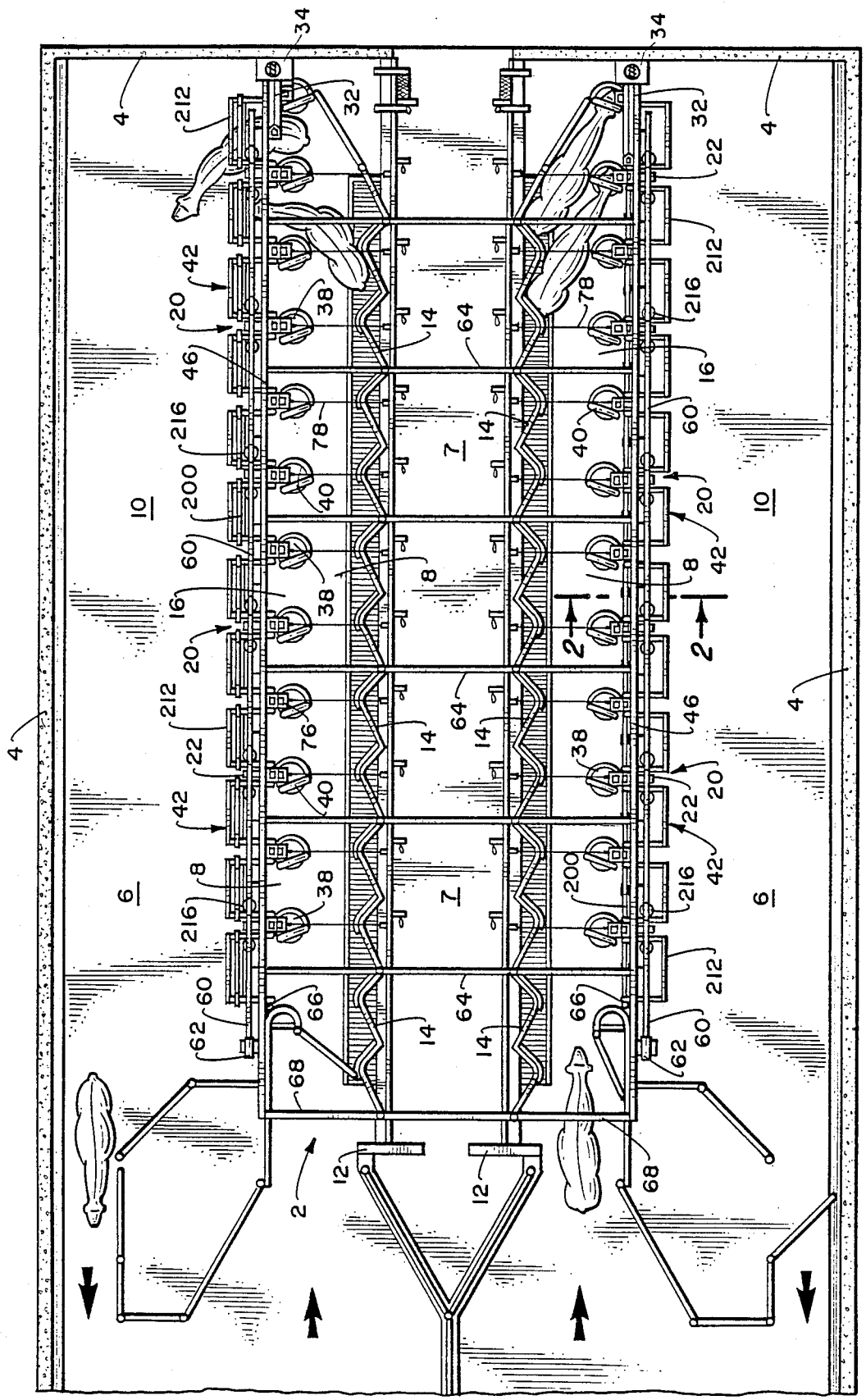
FIG. 1 is a top plan view illustrating the improved milking parlor of the invention with regard to conventional parlor barns.

Referring now to the drawings, wherein like numerals of reference designate like elements throughout, it will be seen that a typical milking barn 2 is illustrated having exterior walls 4 with concrete floor 6 or the like and having a central milking pit 7 of rectangular configuration with juxtapositioned cattle stands 8 and exit corridors 10 leading to the outside of the structure 2.

The structure 2 is also provided with egress-entry doors 12 by which cattle may enter from a holding pen or wash facility (not shown) to the milking stands 8, as is known in the art.

Convolute splash shields 14 are also provided as is conventional so as to form a backstop for the individual cattle receiving stations 16, as best seen in FIG. 1.

Each of the cattle receiving stations 16 are formed in the cattle stands 8 in typical fashion and in conformity with the herein disclosed invention. A modular unit 20 forms the basic structure or member comprising at least two of the individual milking or feeding stations 16 in cooperation with the splash shield 14.

The individual module 20 is fabricated of two spaced-apart, hollow, upright members 22, in this particular instance of heavy gauge steel of U-shaped configuration and being anchored in concrete floor 6 by means not shown.

Each hollow member 22 is of 12-gauge steel and is of 6 inch square tubular construction and may be provided with a see-through window at the top, as described in U.S. Pat. No. 4,419,961 which is incorporated by reference herein. The vertical members 22 have superpositioned thereover a conveyer member 32, in this particular instance having auger 34 to feed fodder and the like from supply hoppers (not shown) to the individual hollow vertical members 22, as described in the aforesaid patent.

As shown in FIGS. 1–3, hung from each member 22 is feed bowl 36 and encircling shroud 38 having entry pipe member 40 defining a support structure to support the shroud 38 and to offer barrier protection against an individual cow damaging vertical member 22.

Horizontally mounted chute member 76 is pulled to the open position (shown in FIGS. 2 and 3) by hand cord 78 attached to an additional opening mechanism, as further described in the aforementioned patent. Opening of the chute 74 permits fodder and the like to drop into the feed bowl 36 from the conveyer member 27.

Suspended from each vertical member 22 in upwardly raisable supported fashion is each of the gates 42 fabricated of steel hollow pipe, welded or otherwise secured, to form a barrier gate at each of the individual cattle stations 16. An axial box beam 46, which runs the extent of the milking parlor barn, is bolted or otherwise secured to the vertical member 22. The axial box beam 46 provides support for gate opening and closing mechanism 50.

The suspension of each of the gates 42 from their vertical member 22 and the gate actuation mechanism 50 will be described in further detail below. Essentially, the gate mechanism 50 is adapted to convert horizontal linear movement by an elongated draw-rod member or draw-bar 60 into vertical linear movement so as to raise and lower each of the gates 42. The draw-bar 60 may be manually actuated or, in this particular instance, may be actuated by an air cylinder 62 shown in FIG. 1 to open or close the individual gates 42. As will be more fully described hereinafter, the air cylinder 62 serves to open the gates 42 and serves to control closure of the gates 42.

As will be seen below, the gates 42 are opened in pairs (or, in some cases, threes). In order to open the individual gates in pairs (or threes), a manual opening gate means may be provided. Thus the pairs of individual gates may be opened in tandem or all at one time or a pair of gates may be individually opened, if desired.

At spaced and appropriate places, cross-tie members 64 are utilized in order to rigidify the improved parlor construction of the invention. Also, appropriate end vertical members, such as 66, may be utilized where appropriate and needed, as for example, where support bars 68 are positioned at the entrances to the milking stands 8 as shown in FIG. 1.

Referring now to FIGS. 2 and 3, it will be seen that each of the gates 42 comprises a plurality of substantially equally spaced apart horizontal members: an upper horizontal member 200, at least one middle horizontal member 202 (three such middle horizontal members are depicted in FIGS. 2–5) and a lower horizontal member 204.

The middle horizontal members 202 are secured, such as by welding, to a pair of vertical side supports 206. The tops of the vertical side supports 206 are secured, as by welding, to the bottom surface of the upper horizontal member 200, while the bottoms of the vertical side supports 206 are likewise secured to the top surface of the lower horizontal member 204.

Alternatively, the middle bar members 202 may be vertically arranged, welded to upper 200 and lower 204 horizontal members.

A pair of vertical support guide pipes 208, curved at a location sufficiently high to permit cattle to pass through when the gate is raised, provide a support and guiding function for each of the gates 42. The vertical guide pipes 208 may be secured, such as by bolts or welding, to the vertical upright members 22.

Upper and lower horizontal members 200 and 204, respectively, are provided with a U-shaped bushing member 210, which is rotatably secured in the ends of the members 200 and 204, which are hollow. The upperends of the vertical support guide pipes 206 are secured together by a cross-bar 212.

The angle of the bend of the guide pipes 208 is not critical, other than the angle sufficient to accommodate overhead clearance and not so sharp as to cause undue strain on each of the gates 42 and the gate actuation mechanism 50 during raising and lowering of the gates 42.

Figure 10:
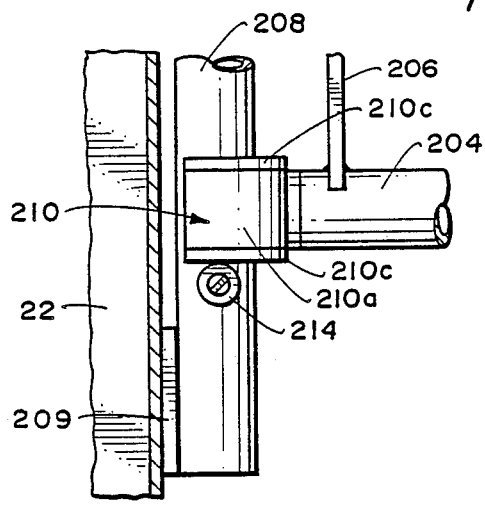
FIG. 10 is a side elevational view, partially in cross-section, taken along the line 10—10 of FIG. 9.
Figure 11:
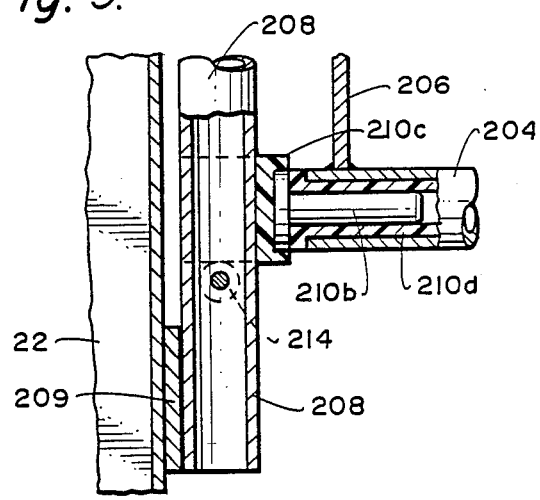
FIG. 11 is a cross-sectional view taken along the line 11—11 of FIG. 9.

As shown in FIGS. 10 and 11, the U-shaped member 210 comprises two portions, secured as by welding to the base thereof. The bight of the U-shaped portion 210a is provided with a low-friction material 210c, while the extension 210b is provided with a sleeve 210d of low-friction material. The low-friction material may comprise polyetrafluoroethylene, available under the trade designation "Teflon", nylon or other suitable material.

Figure 12:
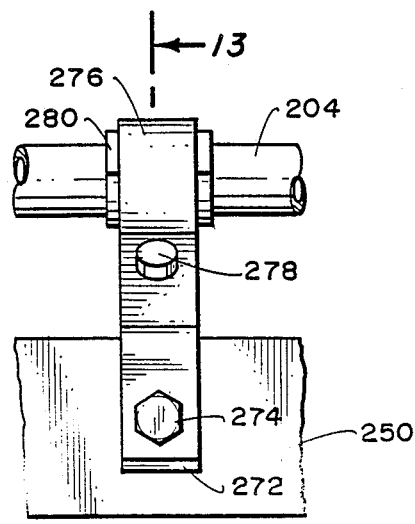
FIG. 12 is a top plan view of a portion of FIG. 4, taken along the line 12—12 of FIG. 4.
Figure 13:
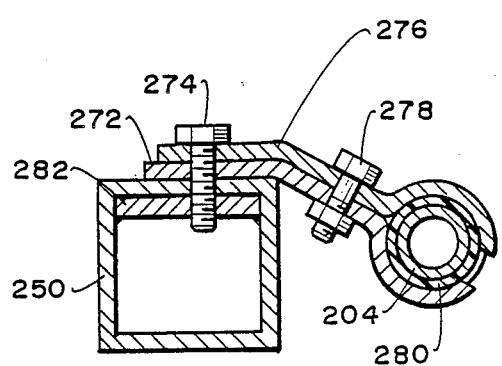
FIG. 13 is a cross-sectional view taken along the line 13—13 of FIG. 12.

The details of the coupling of the lower horizontal member 204 to the vertical support guide pipes 208 are best depicted in FIGS. 12–13. The coupling of the upper horizontal member 200 to the vertical support guide pipe 208 is similar. Basically, the U-shaped portion of low-friction material 210c partially encompasses the vertical support guide pipe 208 to permit essentially frictionless movement therealong. The extension 210b and its sleeve 210d extend into the interior of the hollow tubes 200, 204 and provide essentially frictionless rotation of the bushing 210 with respect thereto during the raising and lowering of the gates 42.

An abutment stop 214 is provided, as shown in FIGS. 10–11, to ensure that the gates 42 stop at the appropriate location when lowered from their fully raised position and to provide a rest stop for the gates 42.

Figure 6:
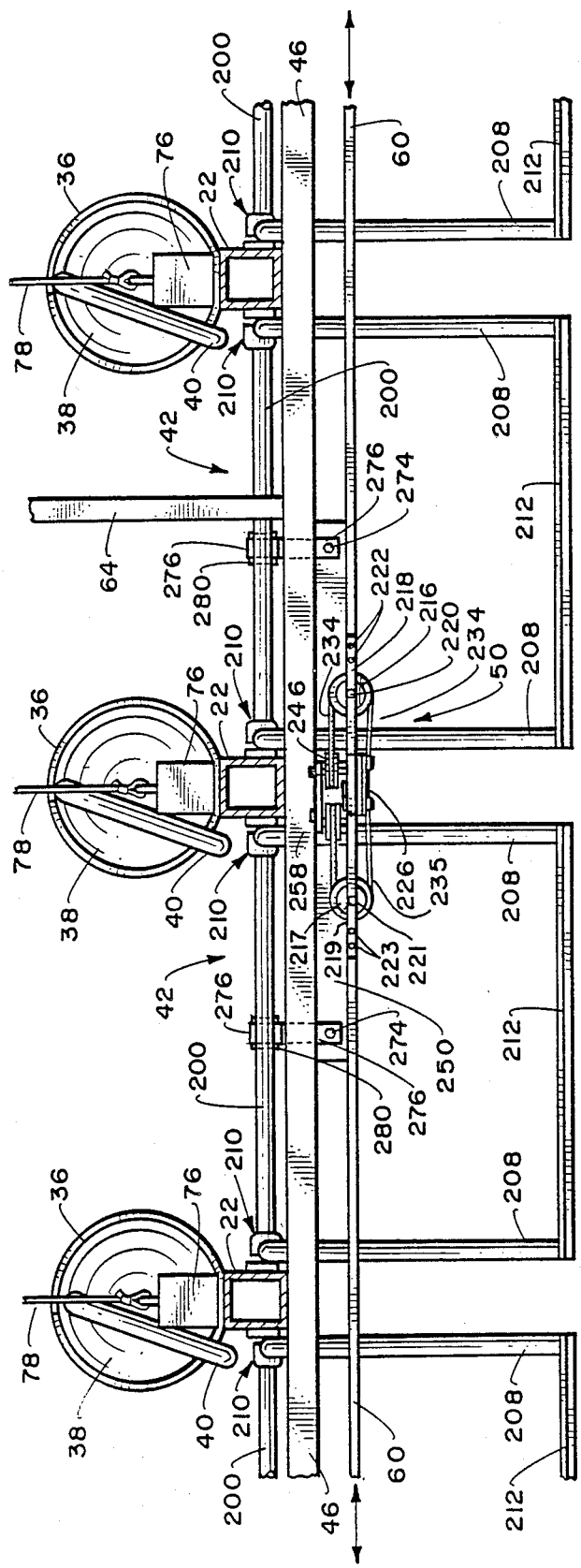
FIG. 6 is a top plan view taken along the line 6—6 of FIG. 2.
Figure 7:
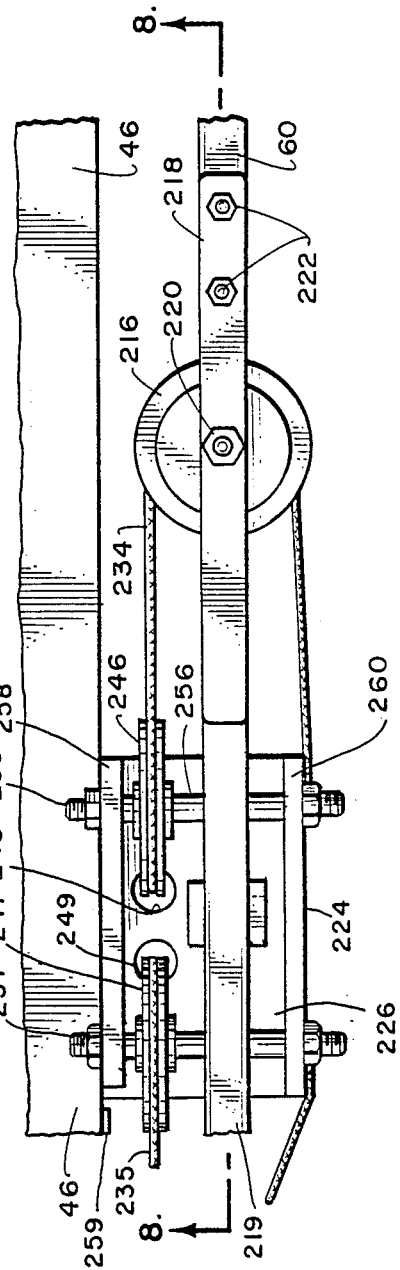
FIG. 7 is a top plan view of a portion of FIG. 4, taken along the line 7—7 of FIG. 4.
Figure 8:
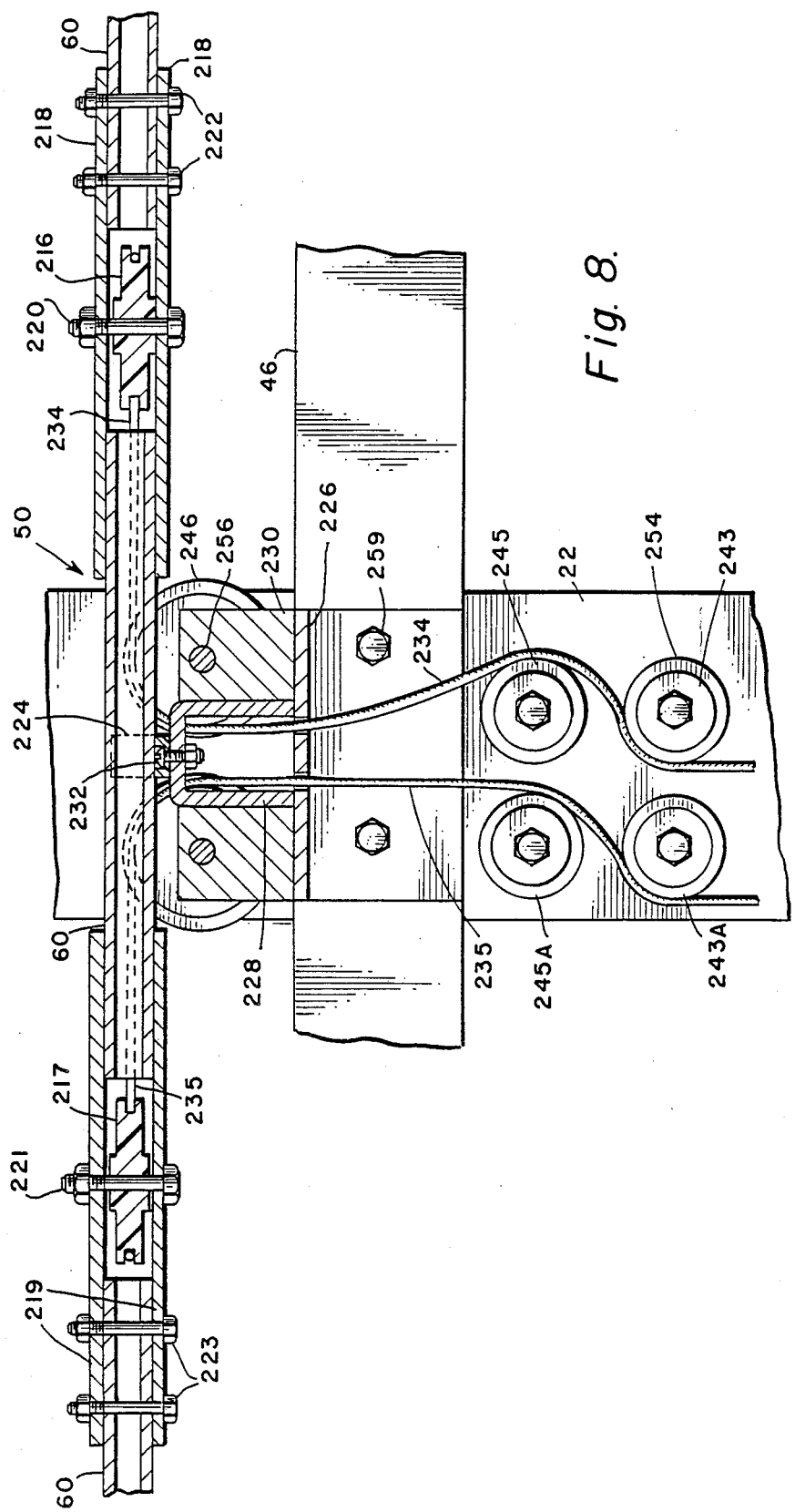
FIG. 8 is a side elevational view, partially in cross-section, taken along the line 8—8 of FIG. 7.
Figure 9:
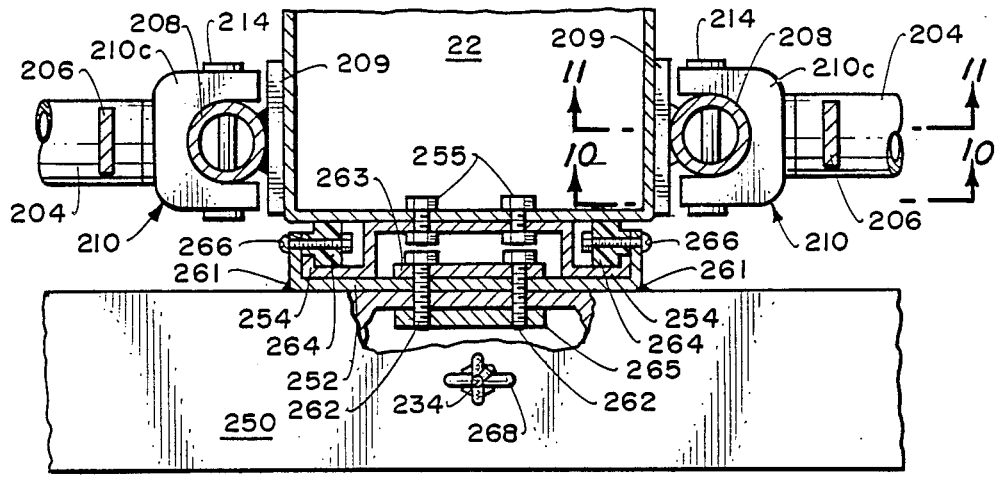
FIG. 9 is a top plan view of a portion of FIG. 4, partially in cross-section, taken along the line 9—9 of FIG. 4.

As shown in FIGS. 6–8, the gates 42 are raised and lowered by the axial actuation mechanism 50, which is supported by the axial box beam 46. The actuation mechanism 50 comprises laterally movable draw-rod 60. The draw-rod 60 is secured to a plurality of horizontal traveling pulleys 216 and 217 located adjacent each side of each pair of cattle stands 8. In particular, pulleys 216 and 217 are attached to the draw-rod 60 via upper and lower straps 218 and 219 respectively, employing fastening means 220 and 221, respectively, through the center of the pulleys and fastening means 222 and 223, respectively, through the draw-rod 60. The other ends of the draw-rod 60 may be secured to the straps 218 and 219 by welding or other suitable means.

The draw-rod 60 is moved laterally either manually or by a pneumatic cylinder, such as air cylinder 62 depicted schematically in FIG. 1. The draw-rod 60 is supported periodically by a U-shaped bushing 224 comprising a low-friction material, such as "Teflon" or nylon, to permit sliding of the draw-rod 60 during actuation of gate actuation means 50. The bushings 224 are supported by horizontal plates by an inverted double L-shaped plate 228, in turn supported by a vertical plate 230. The plate 228 is secured to the horizontal plate 226 such as by welding which is conveniently secured to the bushing 224 by means such as bolts 232.

Cables 234 and 235 engage the traveling pulleys 216 and 217, respectively. One portion of the cable 234 passes over a first vertical pulley 246 secured to the horizontal plate 226. The cable 234 passes through an opening 248 in the horizontal plate 226 and about guide pulleys 243 and 245 mounted on the vertical member 22, to a horizontal bar 250, which is secured to a movable carrier 252 maintained in a track 254 mounted along one side of the vertical member 22. The other end of the Cable 234 is anchored with respect to Plate 226 or verticular plate 260.

In like manner, a cable 235 engages the traveling pulley 217. One portion of the cable 235 passes over a first vertical pulley 247 secured to the horizontal plate 226. The cable 235 passes through an opening 249 in the horizontal plate 226 and about guide pulleys 243A, 245A, 247A, and 249A, mounted on the vertical member 22, to the horizontal bar 250 secured to the carrier 252. The other end of the cable is anchored with respect to plate 226 or the plate 260.

The vertical pulleys 246 and 247 are mounted in tandem, respectively, with bolts 256 and 257 passing through the centers thereof and secured, respectively, through vertical mounting plates 258 and 260, which in turn is secured to the axial box beam 46 by bolt 259. The plate 260 is secured respectively to horizontal plate 226, as by welding, to provide support for the opposite ends of the bolt 256 and 257. The track 254 is secured to the vertical member 22 by welding.

Figure 5:
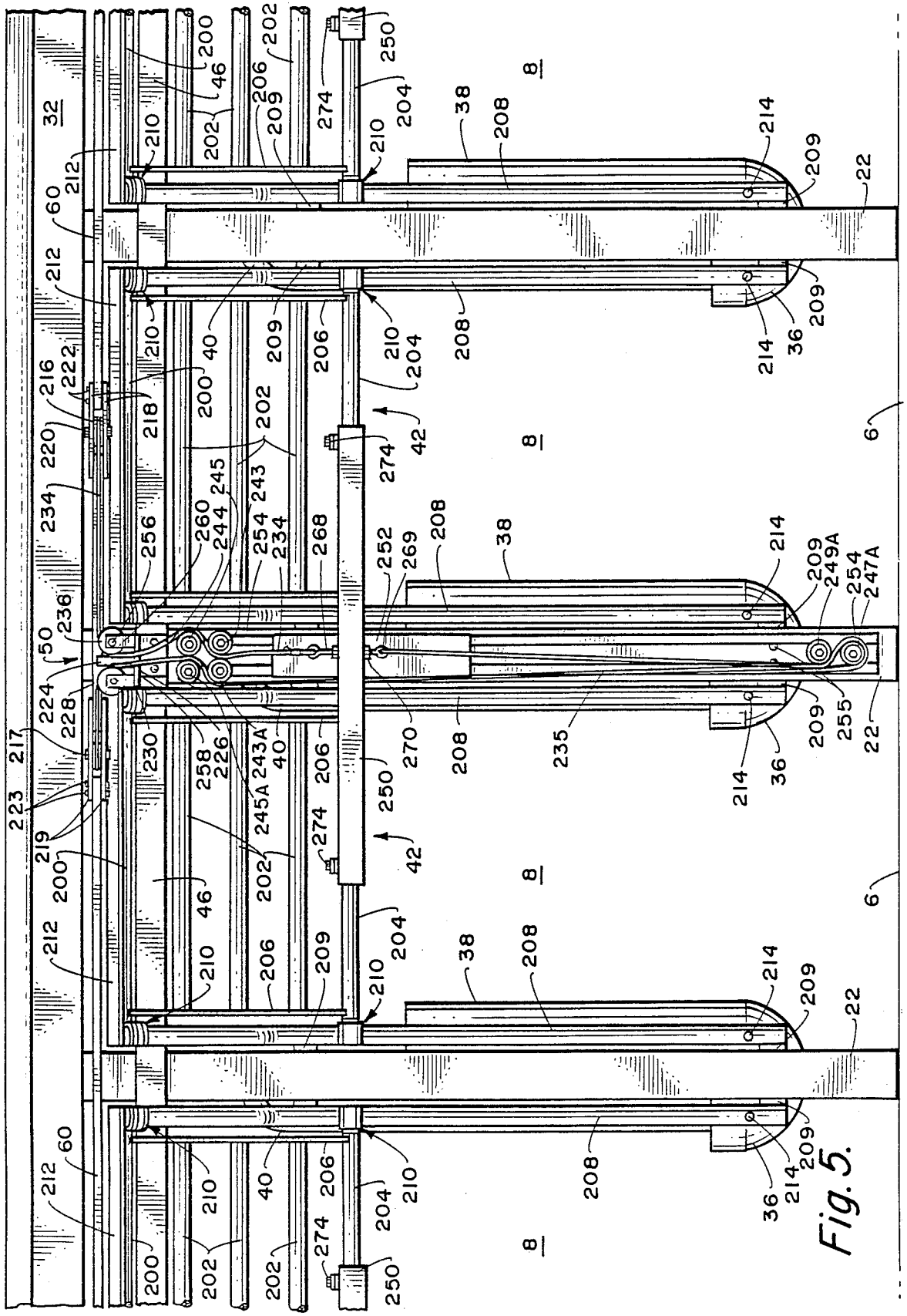
FIG. 5 is a view similar to that of FIG. 4, taken along the line 5—5 of FIG. 3.

As indicated above, each of the cables 234 and 235 has one end thereof opposingly connected to the horizontal bar 250 which is connected to the carrier 252, which in turn is mounted on the track 254. There is one such track for each two modules, as shown in FIGS. 3–5, to control the gates of two modules, two such tracks, located on the inner two pillers 22 of three modules may be employed. In such a case, the three modules are desirably coupled at the end of a run.

Details of the gate lifting mechanism are provided in FIGS. 6–8, while overall views are shown in FIGS. 25. The carrier 252 is secured to the horizontal bar 250, as by welding, as shown at weldments 261. Alternatively, and more preferably, the carrier 252 is secured to the horizontal bar 250 by threaded bolts 262, which pass through reinforcement plate 263, secured to the inside of the carrier 252, thence through the carrier 252 and into weld plate 265, secured inside the horizontal bar 250 and drilled and tapped to receive the threaded bolts 262.

The carrier 252 is provided with glides or wheels 264, comprised of a low-friction material, such as "Teflon" or nylon, attached to the carrier 252 by fastening means such as bolts 266. The cables 234 and 235 are attached to the horizontal bar 250 by fastening means such as hooks 268 and 269, which are secured through the bar 250 by means such as a bolt 270 or possibly two bolts.

The glides or wheels 264 permit the carrier 252 to travel easily along the track 254. There are four such glides or wheels 264, two at each end of the carrier 252, on either side of the track 254.

Like vertical upright member 22, the carrier 252, track 254, horizontal bar 250 and other flat parts (or parts made from flat parts) conveniently comprise 12 gauge mild steel, galvanized or stainless steel. All corners are rolled to prevent cutting or other injury to the cattle.

The horizontal bar 250 is coupled at either end to the lower horizontal member 204 of the gate 42 by a combination strap 272, fastened to the bar 250 by means such as threaded bolt 274, and a C-clamp 276, which is fastened to the strap 272 by means such as bolt 278. An inset guide 280 of low-friction material, such as "Teflon" or nylon, permits rotation of the lower horizontal member 204 with respect to the horizontal bar 250 during raising and lowering of the gate 42. A weld plate 282, welded to the inside of the bar 250, may be drilled and tapped to receive the threaded bolt 274.

Following feeding and milking of the cattle in the cattle stands 8, the gate 42, which is in the down position during this period of time, is raised. As shown in FIGS. 3 and 5, the actuating mechanism 50, such as air cylinder 62, causes the draw-rod 60 to move, thereby causing the traveling pulleys 216 and 217 to move with the draw-rod 60. By means of cables 234 and 235, the bar 250 is raised, guided by carrier 252 in track 254. At the same time, raising of gate 42 and carrier 252 shortens the distance between pulleys 217 and 247, thereby allowing cable 235 slack sufficient to permit the gates 42 movement upward. The distance between traveling pulley 216 and pulley 246 is increased causing tension in cable 234 which pulls up the gates 42 upwardly. Since the bar is coupled to two gates 42, both gates rise simultaneously. Of course, draw-rod 60 may be coupled to a plurality of pulleys 216 and 217, thereby causing a plurality of pairs of gates 42 to raise.

The length of the cables 234 and 235 is such that the upper horizontal member 200 of the gate 42 stops short of the cross-tie 212, with the lower horizontal bar 204 still o the vertical portion of the bent guide 208.

Following egress of the cattle, the gate 42 is lowered, with the draw-rod 60 returned to its original position, along with traveling pulleys 216 and 217 respectively, and consequent lowering of the carrier 252 and horizontal bar 250 as shown in FIGS. 2 and 4. However, as draw-rod 60 is retracted, the weight of the gate 42 places tension on cable 235. The distance between the traveling pulley 217 and pulley 247 is lengthened causing tension on cable 235 which pulls down the gates 42 in a controlled manner. Simultaneously, the distance between pulley 216 and pulley 246 decreases allowing slack in cable 234, thereby letting the gates 42 lower in a controlled manner. This serves to retard lowering of the gate 42 and to cause the gate 42 to be lowered in a slow and controlled manner. If a cow has started to leave the cattle station and is positioned in the downward path of the gate 42, the air cylinder 62, draw-rod 60 and cable 234 will serve to lower the gate gently so that the cow will not be startled or injured. But, more importantly, the gates do not jerk and all the cables stay on their respective pulleys. If the draw-rod 60 is connected to a plurality of gates 42, halting of the downward movement of any one of the gates 42 will also halt all of the connected gates 42 until the interfering cow was moved out of the way. When the gates 42 are fully lowered, stops 214 prevent further lowering of the gates 42.

Thus, there has been disclosed an improved milking parlor construction having a modular construction and provided with at least two upraising gates. The improved milking parlor construction is particularly suited for existing barns in which space for permitting cows to exit is limited. While specific construction and design materials have been alluded to, the same have been used for purposes of description only and are not to be taken as delimiting of the invention. Indeed, those of ordinary skill in the art will at once recognize various changes and modifications that may be made to the disclosed invention, and all such changes and modifications will not deviate from the spirit and essence of the invention and all are intended to be covered by the appended claims.

We claim:

1. An improved exit gate for milking parlors, comprising:
   at least one cattle station having at least one generally rectangular vertical member and a box beam secured adjacent the upper end of said vertical member and extending horizontally therefrom;
   a gate pivotally secured to said vertical member for vertical movement between a raised open position and a lowered closed position;
   first movement means for moving said gate connected to said gate and actuable to raise said gate, including an air cylinder mounted on said box beam, a draw-rod movable by said air cylinder between an extended and a retracted position, a traveling pulley carried by said draw-rod, a first cable having one end secured in a fixed position and passing about said traveling pulley and having the opposite end of said first cable secured to said gate, whereby actuation of said air cylinder will retract said draw-rod and said traveling pulley and cause said first cable to raise said gate and
   second movement means for moving said gate connected to said gate and actuable to lower said gate in a slow and controlled manner.

2. The exit gate of claim 1, further wherein:
   said second movement means comprises a second traveling pulley carried by said draw-rod,
   a second cable having one end secured in a fixed position and passing about said second travelling pulley and having the opposite end of said second cable secured to said gate, whereby raising of said gate will cause said second cable to move said second traveling pulley and to cause said second cable to pull said gate downward against the action of said air cylinder to cause said gate to move downward in a slow and controlled manner.

3. The exit gate of claim 2 further comprising:
   a vertical track mounted on said vertical member,
   a carrier slidable along said track and operable to move said gate between said raised and lowered positions,
   said first and second cables being connected to said carrier.

4. A milking parlor construction comprising in combination:
   (a) a module comprising at least two spaced-apart, hollow vertical upright members adapted for rigid securement in a base or the like;
   (b) a feed bowl means secured to each said hollow vertical upright member and defining a cattle feeding station;
   (c) a feed conveyor means superpositioned in stationary position to said hollow vertical upright members and adapted to deliver feed to said hollow vertical upright members defining a feed passageway having communication to said feed bowl means;
   (d) at least two pivoted gate members vertically upraisable and mounted on each said hollow vertical upright member and being adapted to move vertically and pivotally between an upper open and a lower closed position; and
   (e) means to controllably move at least pairs of said gate members into a selected one of the open and closed positions comprising two cables.

5. The milking parlor construction in accordance with claim 4 including remotely positioned means to open a pair or a selected plurality of said pivotal gate members.

6. The milking parlor construction in accordance with claim 5 wherein said pivotal gate members are pneumatically controlled.

7. The milking parlor construction in accordance with claim 4, wherein each said pivotal gate member comprise an upper horizontal bar, at least one intermediate horizontal bar and a lower horizontal bar, with said at least one intermediate horizontal bar secured to vertical side members which are in turn secured to said upper and lower horizontal bars, wherein said module includes at least two pairs of vertical bars, secured to said hollow vertical uprights members and bent in toward said module at a height above that of cattle for guiding the movement of said pivotal gate member, and wherein said upper and lower horizontal bars are slidably engaged on said pair of vertical bars, said means to controllably move said gate members wherein said cables create opposing tensions.

8. The milking parlor construction in accordance with claim 7, wherein said gate moving means further includes a horizontal rod secured to at least two pivotal gate members and coupled to said means for moving said two pivotal gate members into said open and closed positions.

9. The milking parlor construction in accordance with claim 8, wherein said means for moving said pivotal gate member into said open and closed positions comprises a laterally movable horizontal draw-rod mounted near the top of said module, carrying at least two horizontally mounted traveling pulleys, connected by said cables to said gate moving means.

10. The milking parlor construction in accordance with claim 9, wherein said horizontally mounted traveling pulleys are associated with two pivotal gate members and wherein said gate moving means is coupled to said two pivotal gate members.

11. The milking parlor construction in accordance with claim 9, wherein said horizontally mounted traveling pulleys are associated with three pivotal gate members and wherein said gate moving means is coupled to said three pivotal gate members.

12. A milking parlor construction comprising in combination:
   (a) a module comprising at least two spaced-apart, hollow vertical upright members adapted for rigid securement in a base or the like;
   (b) a feed bowl means secured to each said hollow vertical upright member and defining a cattle feed station;
   (c) a feed conveyer means superpositioned in stationary position to said hollow vertical upright members and adapted to deliver feed to said hollow vertical upright members defining a feed passageway having communication to said feed bowl means;

(d) at least two pivotal gate members vertically upraisable and mounted on each said hollow vertical upright member and being adapted to move between an upper angled open position and a lower vertical closed position, said pivotal gate members each including upper and lower horizontal bars;

(e) at least two pairs of vertical bars associated with each module and secured to said hollow vertical upright members, bent in toward said module at a height above that of cattle for guiding the movement of each said pivotal gate members;

(f) guide means rotatably mounted in the ends of said upper and lower horizontal bars of each said pivotal gate member and slidably engaged on a pair of said vertical bars; and (g) means to move at least pairs of said pivotal gate members into a selected one of the open and closed positions, said means including a laterally movable horizontal draw-rod mounted near the top of said module, means to translate horizontal motion of said draw-rod into vertical motion, including two oppositely positioned horizontally mounted traveling pulleys, and a carrier slidably mounted in a vertical track secured to said vertical upright member, said carrier connected to said vertical motion translation means and to at least two said pivotal gate members through a horizontal rod secured to said at least two pivotal gate members.

13. The milking parlor construction in accordance with claim 12, wherein said horizontally mounted traveling pulleys are associated with two pivotal gate members, said construction further comprising two attachment means attached to said gate members creating tension in opposite and opposing directions, and wherein said gate moving means in coupled to said two pivotal gate members.

14. The milking parlor construction in accordance with claim 13 wherein said horizontally mounted traveling pulleys are associated with three pivotal gate members and wherein said gate moving means is coupled to said three pivotal gate members, and wherein said attachment means are cables attached to opposite ends of said gate members.

15. A milking parlor construction comprising in combination:

(a) module comprising at least two spaced apart, hollow vertical upright members adapted for rigid securement in a base or the like;

(b) a feed bowl means secured to each said hollow vertical upright member and defining a cattle feeding station;

(c) a feed conveyor means superpositioned in stationary position to said hollow vertical upright members and adapted to deliver feed to said hollow vertical upright members defining a feed passageway having communication to said feed bowl means;

(d) at least two gate members vertically upraisable and mounted on each said hollow vertical upright member and being adapted to move between an upper open and a lower closed position;

(e) remote positioning means to move at least pairs of said gate members into a selected one of the open and closed positions and wherein each of said gate members comprises an upper horizontal bar, at least one intermediate horizontal bar and a lower horizontal bar, with said at least one intermediate horizontal bar secured to vertical side members which are in turn secured to said upper and lower horizontal bars, wherein said module includes at least two pairs of vertical bars, secured to said hollow vertical upright members and bent in toward said module at a height above that of cattle for guiding the movement of said gate member, and wherein said upper and lower horizontal bars ar e slidably engaged on aid pair of vertical bars, the ends of said upper and lower horizontal bars being provided with a U-shaped member which partially encompasses said vertical bar, said U-shaped member including a substantially frictionless material in the bight thereof and further including an extension member for insertion into the interior of said horizontal bars, said extension member including a substantially frictionless sleeve material and wherein gate moving means includes a carrier slidably mounted in a vertical track secured to said vertical upright member, said carrier connected to gate moving means wherein said gate moving means further include a horizontal rod secured to at least two gate members and coupled to said means for moving said two gate members into said open and closed positions and wherein said means for moving said gate member into said open and closed positions comprises a laterally movable horizontal draw-rod mounted near the top of said module, carrying at least two horizontally mounted pulleys, connected by cables to opposite sides of members of said gate, wherein said horizontally mounted traveling pulleys are associated with three gate members such that said gate members are controllably held in constant tension between said cables before, during, after said opening and closing of said gate members.

* * * * *